Jan. 19, 1965     H. E. CLARK     3,166,420

SIMULTANEOUS IMAGE FORMATION

Filed May 7, 1959     2 Sheets-Sheet 1

INVENTOR.
HAROLD E. CLARK

BY Stanley Z. Cole

ATTORNEY 3,166,420
SIMULTANEOUS IMAGE FORMATION
Harold E. Clark, Penfield, N.Y., assignor to Xerox
Corporation, a corporation of New York
Filed May 7, 1959, Ser. No. 811,653
4 Claims. (Cl. 96—1)

This invention relates in general to xerography and in particular to image development and image projection.

The concern of this invention is image development of a xerographic plate with conductive developer particles simultaneously with exposure of the plate to an image pattern. These particles are brought to the surface to be developed while supported as a substantially uniform layer on a conductive support member and because of varying electric fields of force brought about by exposure, selective particle movement in accordance with the image pattern results, thereby producing a developed image on the xerographic plate. In addition, when proper controls are exercised, a useful photographically reversed developed image of the developed image on the xerographic plate is formed on the conductive support member and, if desired, either or both of the developed images may be used in a projection system which presents the formed image on a screen for viewing purposes or either or both of these images may be transferred or otherwise utilized.

It is accordingly an object of this invention to devise new manipulations to improve the art of xerography.

It is a further object of this invention to devise new and improved techniques of image development which produce a print simultaneously with exposure.

It is a further object of this invention to define novel manipulations to form an improved projected image for viewing purposes.

It is a further object of this invention to improve xerographic apparatus.

It is a yet further object of this invention to devise improved xerographic apparatus which rapidly provides access to the developed image.

It is a still further object of this invention to devise novel apparatus for image projection.

For a better understanding of the invention and for additional objects thereof, reference is had to the following description to be read in conjunction with the drawings, wherein.

Figure 1:
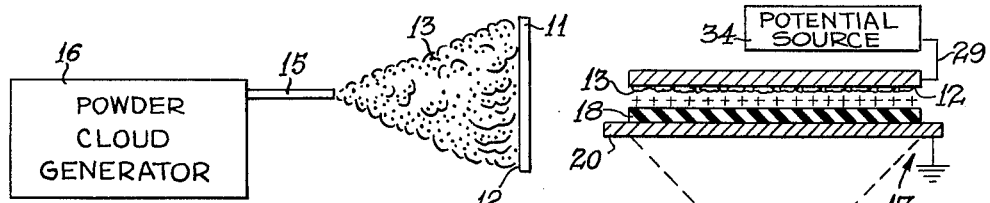
FIG. 1 is a schematic representation of the preparation of a developer dispensing member for use in accordance with the invention.

Referring now to FIG. 1, there is illustrated schematically a method of preparing a developer dispensing member 11 having a dispensing surface 12. A basic requirement of member 11 is that at least surface 12 be electrically conductive. If it is desired to use the dispensing member 11 for projection purposes as described in connection with FIG. 5, then also surface 12 should be specularly reflecting and should specularly reflect a large fraction of incident light with a minimum of diffuse reflection. When specularly reflecting it should be relatively smooth and free from ripples and waviness as to permit reflection with a minimum of distortion. These requirements for developer dispensing member 11 may be satisfied by any of a wide variety of constructions. The member may conveniently be a sheet of metal such as steel, stainless steel, or aluminum. When surface 12 is specularly reflecting these various materials should have at least one polished surface or dispensing member 11 may comprise a sheet of these or other metals with a polished coating of chromium, or the like on surface 12. Dispensing member 11 may also comprise a non-conductive member such as a sheet of glass or plastic having a thin conductive coating, such as evaporated aluminum or chemically deposited silver on surface 12. Again, if specularly reflecting, surface 12 should be a polished surface, and preferably also it should reflect at least more than about 20% of the incident light directed thereto. Member 11 can either be rigid or flexible, as desired.

Figure 5:
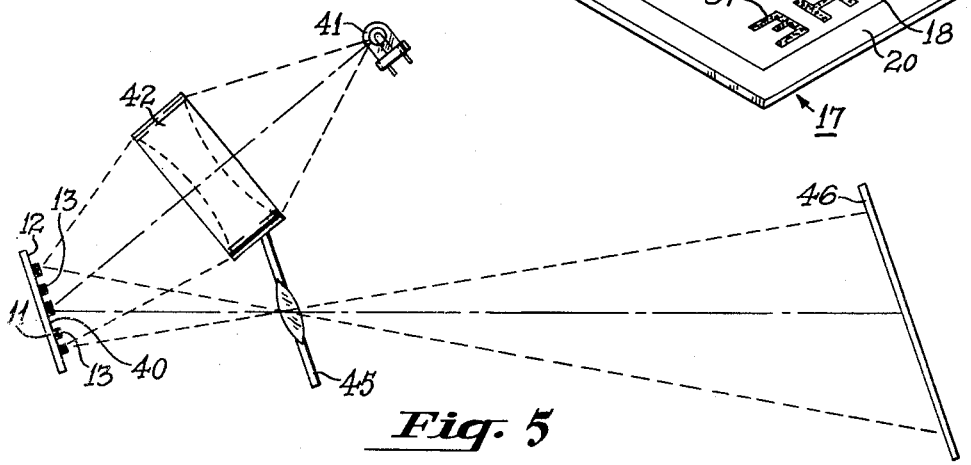
FIG. 5 is a schematic representation of image projection of the developer dispensing member being removed in FIG. 4; and, FIG. 6 represents an automatic xerographic apparatus illustrating an embodiment of this invention.

Dispensing surface 12 of dispensing member 11 is, in FIG. 1, being coated with a thin uniform layer of conductive developer powder particles 13 fed in an aerosol from nozzle 15 to surface 12 of dispensing member 11. The aerosol is created within powder cloud generator 16. Particles of this aerosol should be small in size and generally less than about 20 microns in diameter to permit good quality image development. If continuous tone images are to be developed, a particle size of about 5 microns or less is generally preferred. The particles should also be non-toxic, non-corrosive and preferably non-hydroscopic. Many powders meet these requirements, but powdered charcoal has been found to be particularly useful. Alternatively, other conductive particles such as metallic particles and the like may be used. The aerosol of powder 13 is fed from nozzle 15 at least until sufficient powder adheres to surface 12 to mask the surface. If the surface is a specular reflecting surface and is to be used for subsequent projection, as illustrated in FIG. 5, then preferably at least enough powder should be deposited to reduce the specular reflection density from the surface to between about 1 and about 3 and generally preferably about 2. If, however, the surface is a non-specular reflecting surface and there is no intention to subsequently use the surface in a projection system, then a substantially greater amount of powder may be deposited on the surface for image development purposes and denser images will be produced during development.

Where there is no requirement for a specularly reflecting surface at surface 12 of dispensing member 11, any of the various well known conductors may be employed. Thus, and for example, instead of a flat surface one may employ a conductive bristle or brush-like surface. The surface may also be pitted or grained, and it may also be fibrous. The conductivity of this surface as well as conductivity of the developer particles 16 will be discussed in connection with FIG. 3.

It is to be realized that the representation in FIG. 1 is only for illustrative purposes, since many modifications and alternatives exist which may be used for depositing a substantially uniform layer of powder on developer dispensing member 11. For example, powder particles may be cascaded across surface 12 of the dispensing member 11, or dispensing member 11 may be dipped into a container of powder or into a mixture of powder and coarse granular carrier, or such a mixture may be poured over surface 12 of dispensing member 11. A liquid mixture may also be fed across surface 12 to result in powder deposition on surface 12. The powder may be allowed to settle thereon as from a shaker or the like. Typically, and generally, the powder which will remain in position on surface 12 of dispensing member 11 will be held in position by van der Waals forces, and in fact although other techniques employing other forces, such as electrostatic, causing the powder to remain in position exist, it is preferred that these other techniques be avoided at least after the surface is loaded in order that the powder remain bound with only minimum forces.

Figure 2:
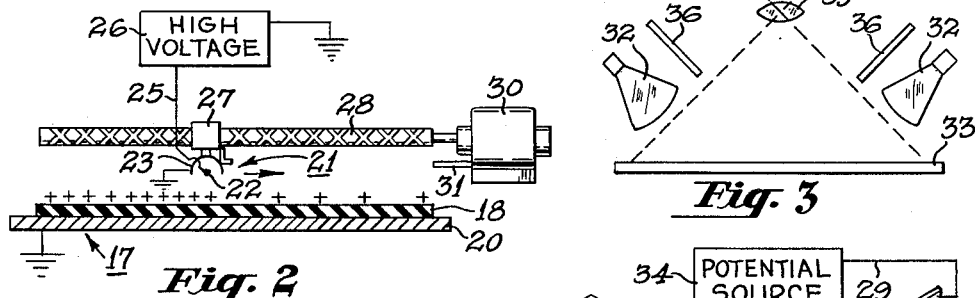
FIG. 2 is a diagrammatic representation of plate sensitization.

Referring now to FIG. 2, there is illustrated sensitization of xerographic plate 17 comprising a photoconductive insulating layer 18 overlying conductive backing member 20. Positioned above plate 17 is corona discharge electrode 21 comprising discharge wire 22 surrounded by shield 23. As illustrated, shield 23 is maintained at ground, and discharge wire 22 is connected through lead 25 to high voltage source 26. Corona discharge electrode 21 is fastened to sleeve 27 which rides on screw drive shaft 28 driven by motor 30. Typically, in operation corona discharge electrode 21 would start along drive shaft 28 at a point adjacent to motor 30. With rotation of shaft 28 discharge electrode 21 is moved to the other extreme of shaft 28 and then, as shown, back toward motor 30. At motor 30 there is illustrated a microswitch 31 which is depressed by discharge electrode 21 when it returns back to the extreme of shaft 28 at motor 30. The microswitch, when depressed, will electrically disconnect the voltage from voltage source 26 as well as stop rotation of motor 30. Sensitization of plate 17 takes place due to the creation of corona discharge about discharge wire 22, and due to the fields of force existing between the ions created in air about discharge electrode 21 and plate 17 resulting in ion movement to the surface of photoconductive insulating layer 18 and thus sensitization of plate 17. Various other known techniques of sensitization are well known and may be employed in connection with this invention. These include, but are not limited to, radioactive charging or plate sensitization, induction charging or plate sensitization, and the like. In this embodiment the plate is illustrated as being sensitized with positive electrostatic charge across its surface. However, negative charging may also be used, and the choice of whether positive or negative charging is employed will often depend on the photoconductive insulating layer 18 of plate 17.

Plate member 17 may be a commercially available xerographic plate and may comprise, for example, a photoconductive insulating layer of selenium overlying a conductive backing layer. It may include various other photoconductive layers such as zinc oxide in a resin insulating binder overlying a conductive layer such as aluminum paper or the like. The plate may be rigid or flexible, and the choice of whether rigid or flexible will depend on the desired subsequent utilization.

Figure 3:
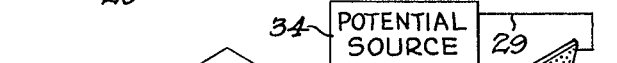
FIG. 3 is a diagrammatic representation of an exposure arrangement in accordance with an embodiment of this invention.

Referring now to FIG. 3, there is illustrated exposure of plate 17 in accordance with this invention comprising photoconductive insulating layer 18 overlying conductive backing member 20. At this point in the manipulations developer dispensing member 11 has a substantially uniform layer of particles 13 across surface 12, and plate 17 is in a sensitive condition having a uniform electrostatic charge across its surface. Dispensing member 11 has been placed with powder particles 13 on surface 12 in physical contact with the photoconductive insulating layer 18. Plate 17 is illustrated in this embodiment as being exposed to a light image pattern created by directing lights 32 to copy 33 and reflecting back through lens 35 a projected image of copy 33. Positioned adjacent to lights 32 are shades 36 to prevent light from lights 32 from directly reaching lens 35 as well as from reaching plate 17. Since in this embodiment exposure of plate 17 is to a light image and since further, exposure is through conductive backing member 20, backing member 20 is transparent. Such a backing member may comprise, for example, a layer of glass carrying a conductive coating such as NESA glass or the like, as is well known in the art. It is to be realized, however, that plate 17 may also be exposed to radiation patterns such as X-ray image patterns or the like and metals and other conductive materials which are not transparent to light and which are transparent to such radiation such as a layer of aluminum, brass, or the like as is well known in the art, may be employed. As should also be apparent, when exposing to X-rays or the like, the radiation pattern may be directed either through the dispensing member 11 or through plate 17 to form the developed image.

As is shown in FIG. 3, plate 17 has backing member 20 grounded during exposure. This allows dissipation of charge to ground during exposure in areas of the plate exposed to light.

Figure 4:
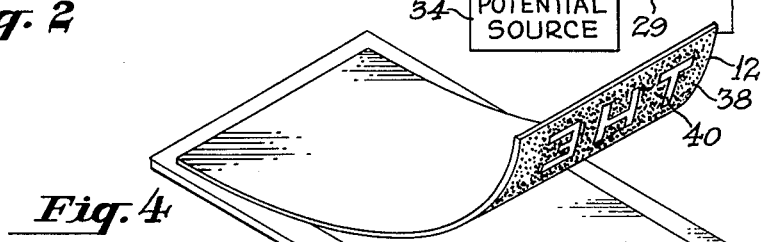
FIG. 4 illustrates removal of the developer dispensing member following exposure and simultaneous development.

A potential is applied from potential source 34 through lead 29 to surface 12 as dispensing member 11 is brought into contact with the xerographic plate 17 and a potential is maintained during exposure and during separation of dispensing member 11 from plate 17 as illustrated in FIG. 4. It is noted that in this illustration potential source 34 is connected through lead 29 to surface 12 since as a minimum surface 12 is conductive. However, if dispensing member 11 is conductive throughout, then connection to any point of dispensing member 11 is adequate for operation in accordance with this invention.

Before describing in detail the development operation which takes place during exposure in FIG. 3, reference is had to FIG. 4 showing the condition of developer dispensing member 11 and plate 17 when dispensing member 11 is removed away from plate 17 comprising photoconductive insulating layer 18 overlying conductive backing member 20. As illustrated, after dispensing member 11 is removed from plate 17 image 37 made up of many individual developer powder particles in image configuration remains on the surface of plate 17. Looking now to developer dispensing member 11, it is seen that on surface 12 of dispensing member 11 there resides developer powder particles in areas of background 38 and substantially no powder particles in areas of image 40. There thus results a transfer of powder particles from member 11 to plate 17 in accordance with the image pattern to which plate 17 is exposed in FIG. 3. There also results a photographically reversed image on the surface of the other member, dispenser 11 or plate 17, when compared to the other member, plate 17 or dispenser 11. During separation a potential is applied to surface 12 of dispensing member 11 through lead 29 from potential source 34.

Development in accordance with this invention simultaneously with exposure is dependent upon the induction of charges into the developer particles on surface 12 of dispensing member 11 to create electric fields and to cause selective movement of particles from surface 12 to photoconductive insulating layer 18 of plate 17. In order to induce charges into developer particles 13 on dispensing member 11, both the particles and at least surface 12 of dispensing member 11 must be at least 2 orders of magnitude more conductive or less resistive than the light resistivity of photoconductive insulating layer 18 of plate 17. Photoconductive insulating layer 18 of plate 17 generally has a resistivity at least as great at $10^{13}$ ohm-centimeters while exposed to light, but it may have a resistivity as low as about $10^{11}$ ohm-centimeters if the processing cycle from sensitization illustrated in FIG. 2 through exposure illustrated in FIG. 3 is sufficiently rapid. In such an instance less resistivity in layer 18 is required since layer 18 does not have to hold uniform charge across its surface for any great length of time. Uusually, however, commercial types of xerographic plates would be used in connection with this invention, and materials having resistivity above $10^{13}$ ohm-centimeters would be employed. Typically then both surface 12 of dispensing member 11 and developer particles 13 across surface 12 of dispensing member 11 should have resistivities of less than about $10^{11}$ ohm-centimeters. Preferably also, these elements should have a resistivity which are at least 3 orders of magnitude more conductive than the light resistivity of photoconductive insulating layer 18 and for most rapid and most efficient operation these elements should be conductors in the usual sense having resistivities in the order of $10^{-4}$ ohm-centimeters, or the like.

In preparing plate 17 for exposure as illustrated in FIG. 3, plate 17 is charged electrostatically as illustrated in FIG. 2. Sensitization of plate 17 is well known in the art and is described in a number of patents. Accordingly, it is felt that no detailed examination of charging is necessary in connection with this invention. However, it may be noted that plates are considered sensitive when they carry a charge across their surface ranging from any where between about a hundred volts to about a thousand volts, and in fact, depending on the thickness of the plate, the charge across the surface may be in excess of a thousand volts. Since in this invention development takes place with conductive particles, and since further the particles are electrically connected to a source of potential, charge is readily induced into the particles wherever fields exist. Since a charge exists across the surface of photoconductive insulating layer 18 when dispensing member 11 is placed thereacross, it is necessary to apply a potential to surface 12 of dispensing member 11 to avoid electric fields between surface 12 of dispensing member 11 and the charged surface of photoconductive insulating layer 18, for if fields exist as dispensing member 11 is brought to the surface of photoconductive insulating layer 18, particle transfer to plate 17 takes place. Accordingly, the manipulations start with a condition of no field existing between these facing surfaces and no charge is induced to particle 13 on dispensing member 11. When charges are removed or changed in an area on the surface of photoconductive insulating layer 18, this "no field" condition is disturbed, and immediately a field exists between the surface of photoconductor 18 and surface 12. Since surface 12 is conductive, and since developer particles 13 are in contact with this surface and they too are conductive, charges are immediately induced into particles 13 as controlled by the new field conditions existing in the area. Typically, if an area of positive charge is made more negative, or is reduced to ground, then positive charges would be induced into the particles facing this area. Because of these induced charges, the developer particles move to the plate surface and remain bound in position on this surface forming thereon a pattern of developer particles corresponding to the pattern of electrostatic charges on the surface of photoconductive insulating layer 18 brought about by exposure. Considering this explanation in connection with FIG. 3, it is seen that areas of light which strike photoconductive insulating layer 18 on plate 17 create a situation of greater conductivity through photoconductive insulating layer 18 and result in dissipation of charge from the surface of the photoconductive insulating layer 18 and result in dissipation of charge from the surface of the photoconductive insulating layer 18, through the photoconductive insulating layer and to ground through backing member 20. Accordingly, all areas of plate 17 struck by light result in a change of charge condition on the surface of photoconductive insulating layer 18, and a change in field conditions between the surface of photo conductive insulating layer 18 and surface 12 of dispensing member 11. With this change in field conditions, charges are induced into developer particles 13 across surface 12 of dispensing member 11. In accordance with the change in field conditions, those particles carrying induced charges now adhere to the surface of photoconductive insulating layer 18, thus forming a developed image 37, as illustrated in FIG. 4 which remains a developed image during separation of dispensing member 11 from plate 17 as illustrated in FIG. 4.

The particles which adhere to photoconductive insulating layer 18 are charged particles, and will continue to be bound to plate 17 due to electrostatic fields of force existing between the plate and the particle and due also to the fact that charge will not flow to a significant extent between an insulator and a conductor, and thus the attractive electric fields of force are maintained between the adhering conductive particles and the insulating surface of photoconductive insulating layer 18.

There has been described one technique for carrying out this invention. This technique results in particle transfer to plate 17 in areas of photoconductive insulating layer 18 which are exposed to light. This technique of development is generally referred to in xerography as a reversal system or development of uncharged areas, rather than a positive-to-positive system which results in particle deposition on the plate in areas corresponding to black areas in the original copy and in areas of charge on the plate. A positive-to-positive sytsem, however, is also possible in accordance with this invention. This may be accomplished through proper biasing of surface 12 of developer dispenser 11. The potential applied to the surface should be one which creates no field between the charged surface of photoconductive insulating layer 18 and the surface 12 of dispensing member 11 as they are placed together. In addition, the potential applied should be one which creates no field between surface 12 of dispensing member 11 and areas of photoconductive insulating layer 18, while plate 17 is exposed to light and after exposure. This may be accomplished by controlling the bias applied to surface 12 to cause the potential applied to vary in accordance with light decay characteristics of the photoconductor 18 and plate 17. Decay of the charge on the surface of the plate follows patterns described, for example, in pending patent application Serial No. 706,809, now abandoned. There will thus be created electric fiields of force between surface 12 and photoconductive insulating layer 18 in those areas which are unexposed resulting in particle movement to plate 17 in the exposed areas. Accordingly, the print formed by applying a proper bias potential to cause deposition in the unexposed areas will conform in a positive sense to the original being copied in that areas corresponding to black areas of the original being copied will be developed producing black areas in the copy being formed, and areas corresponding to the background in the copy being reproduced will correspond, through no deposition of developer powder particles, to produce powderless areas in the copy being reproduced.

In the illustration of FIG. 4 an image pattern 40 on developer dispenser 11 is illustrated as being substantially powderless. This will occur when the powder across surface 12 corresponds to substantially the same amount of powder which transfers during development. When surface 12 comprises a specular reflecting surface and is to be used for projection purposes as illustrated, for example, in FIG. 5, then this form of powderless area is desired in order to produce an image for projection purposes. Such a powderless area may also be desired if an intention exists to transfer the powder from surface 12 to a support base such as paper or to fuse the powder while on surface 12 to thereby produce permanent copy. In producing permanent copy on the surface of dispensing member 11, it should, of course, be realized that surface 12 need not necessarily be a specular reflecting surface. However, if there is no desire to utilize the remaining powder on surface 12 of dispensing member 11 after development of the plate, then dispensing member 11 may be loaded to a substantially high level with powder particles 13 across its surface and following separation as illustrated in FIG. 4, it will not be apparent as to where the powder particles transfer from, and in all likelihood no image will be clearly discernable. This, of course, is not objectionable if no further use for this powder layer is anticipated. Clearly, when using a bristle-like layer for conductive surface 12 it would be unlikely to attempt to use the remaining powder particles in the bristles of dispensing member 11, and loading in such an instance can be without the controls suggested previously for a specularly reflecting surface in the range of specular reflectivity of about between 1 and about 3.

Following separation, as illustrated in FIG. 4, one has a developed image on the surface of the xerographic plate, and this image may be utilized as is well known in xerography. Thus, and for example, it may be transferred to paper, permanently fixed through vapor fusing or heat fusing, or the like to make a permanent copy. It may also, for example, be used in a multiple copy producing system such as described in Gundlach U.S. Patent 2,812,709. It may also be used in any of the various known xerographic systems and including the projection system disclosed and described in copending U.S. patent application Serial No. 738,520.

In addition to the use of the image on plate 17 and through choice by using a specular reflecting surface as surface 12 of dispensing member 11, one is provided with the additional flexibility by controlling powder loading as described in connection with FIG. 1 to create a powder display for projection purposes on a highly reflective surface which is not subject to light fatigue and the like, as is the xerographic plate 17, and thus one is able to produce brilliant, bright displays using developer dispensing member 11 as the subject for projection purposes as described in connection with FIG. 5.

Referring now to FIG. 5, there is shown developer dispensing member 11 carrying areas of powder 13 across surface 12 defining image 40 positioned to reflect from specularly reflecting surface 12 in image area 40 light fed thereto from light 41 through condenser 42. The specular reflection from developer dispensing member 11 is next fed through lens 43 surrounded by shade 45 and then to screen 46. The light reaching powder 13 on surface 12 is scattered or absorbed rather than directed through lens 42, and shade 45 acts to assure that scattered light from powder 13 does not weaken the image projected to screen 46. Lens 42 is positioned at a proper distance from dispensing member 11 to focus surface 12 onto screen 46 and at the same time light source 41, condenser 32 and dispensing member 11 are positioned to focus light source 41 at lens 43.

Image receiving screen 46 may comprise a diffuse opaque reflecting surface such as a sheet of paper or a solid member covered with white paint, aluminum paint, or a layer of glass beads, or it may comprise a conventional projection screen, or it may comprise a translucent diffuse surface such as ground glass or tracing paper in which case the projected image may be viewed from either side of image receiving screen 46.

As should be readily apparent, the various process stages illustrated in FIGURES 1 through 5 may be readily mechanized into an automatic or semi-automatic type of machine.

Figure 6:
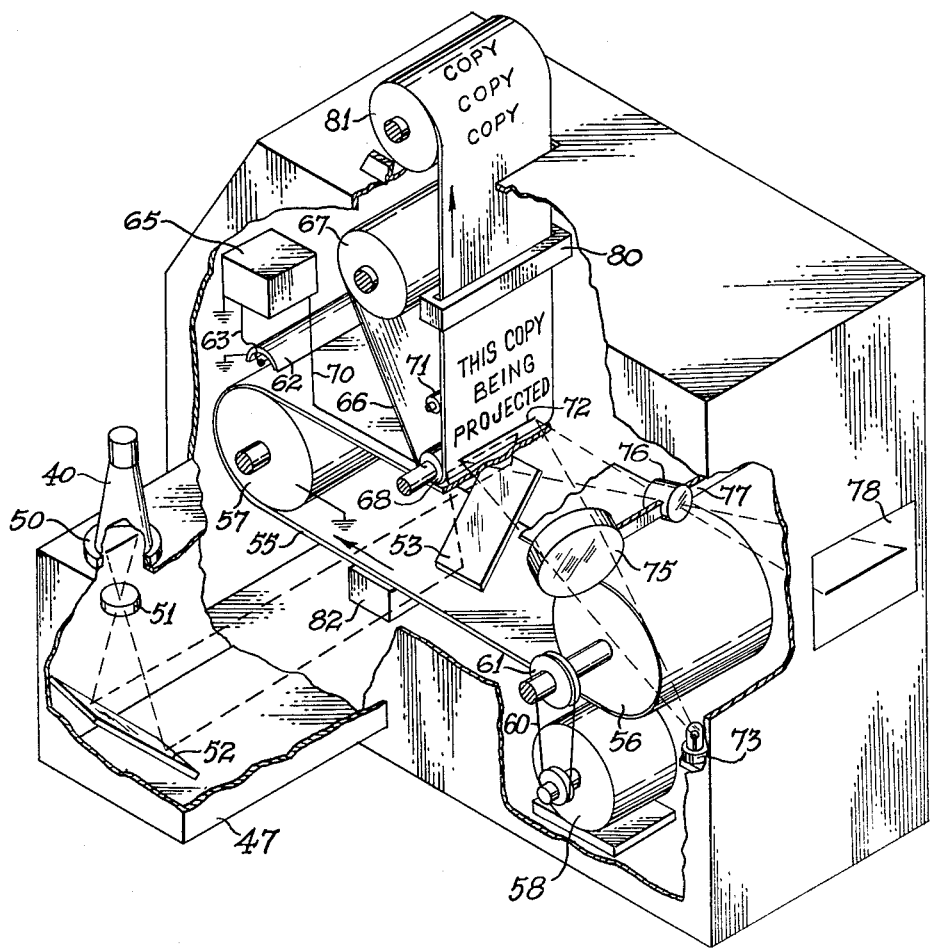

An embodiment of such a machine is illustrated in FIG. 6. This machine includes a housing 47 surrounding the various components of the aparatus. Positioned adjacent to the housing is support means 50 for a cathode ray tube 48 positioned to direct the tube's image through lens 51 to mirror 52 which folds the image and directs the image therefrom to mirror 53. Mirror 53 again folds the image and directs the image to xerographic plate 55. The plate, as in the previous discussion, includes a transparent backing member, and the image reflected from mirror 53 passes through the transparent backing member and to the photoconductive insulating material. Plate 55 comprises a flexible plate which is rotated about support rollers 56 and 57. Roller 57 is a free rolling roller, and roller 56 is driven by motor 58 through belt 60 connected to axle 61 of roller 56. As indicated by the arrow, plate 55 is driven in a substantially clockwise direction. Roller 57 is grounded, and because of the conductivity of the backing member of plate 55 which contacts roller 57, there is provided a path to ground for the backing member of plate 55. The plate in its path of travel passes beneath charging grid 62 having a grounded shield and having a corona discharge wire connected through lead 63 to potential source 65. Potential source 65 supplies to the corona discharge wire a corona discharge potential which results in sensitization of plate 55. The plate is next moved into the exposure zone whereat the light image pattern from cathode ray tube 48 is fed from mirror 53 to plate 55. At the same point there is fed a pre-toned developer dispenser 66 against the outer surface of the photoconductor of plate 55. Developer dispenser 66 may be loaded, for example, as illustrated in FIG. 1 and wound onto a spool 67 from which it is fed into contact with the outer surface of plate 55 at the exposure point. In order to assure physical contact between the toner particles on the surface of developing dispensing member 66, a contact roller 68 is provided at the line of exposure. This roller 68 is conductive and is connected through lead 70 to potential source 65 and provides the electrical connection to web 66 to place web 66 at the potential level desired to prevent an electric field of force from existing between developer dispenser 66 and the surface of plate 55 in areas of charge. Web 66 following passage against plate 55 at the line of exposure is peeled apart from plate 55 while around roller 68, and is supported between roller 68 and roller 71 for projection purposes. At this point there exists copy 72 on the surface of web 66, and in this embodiment since projection is desired the surface of web 66 comprises a specularly reflecting surface as previously defined. This surface is illuminated by lamp 73 through condenser 75 and reflecting back through lens 76 surrounded by shield 77 onto screen 78. In this embodiment, since screen 78 is encompassed by housing 47, screen 78 comprises a translucent material and image viewing takes place from the outer side of housing 47. Web 66 is next, in this embodiment, passed beneath fuser 80 whereat it is permanently affixed to web 66, and then web 66 is fed to take-up spool 81 for storage or subsequent utilization. Plate 55, after rotating about roller 56 is fed to processing station 82 whereat the image on plate 55 may be transferred to paper or the like for storage or other utilization, or the image may be projected to produce a projected image which is photographically reverse of the projected image produced on screen 78 or alternatively, this processing station 82 may comprise simply a cleaning station to remove the powder particles deposited on the surface of plate 55 to present a clean plate for charging and recycling.

The particular machine illustrated in this figure may be employed for line-by-line copying from cathode ray tube 48 and, in fact, each line of copy may be added step by step to web 66 and either projected as a line at a time projection system, or as a larger area encompassing substantially a frame of copy at one time. The apparatus of this figure is also readily usable for projection from cathode ray tube 48 of an entire frame of copy at one time through mirrors 52 and 53 for reproduction of the entire frame and in such a case it is preferable that the drive mechanism for plate 55 be so modified as to cause stop-and-go movement to reproduce a frame at a time on web 66 without image distortion due to movement or the like. Also, although in this embodiment projection of a cathode ray tube image from tube 48 is illustrated, it should be readily apparent that various other original copy to be reproduced may be employed. Thus, and for example, one might project microfilm through the same lens and mirror systems to the plate member. Also, although a pre-toned web 66 is illustrated as fed to plate 55 it should be apparent that toning of the web in accordance with the discussion in connection with FIG. 1 may take place in the apparatus and that in addition such a web may be continuously ret-oned, etc. Similarly, although a flexible plate 55 is illustrated in this figure, a drum or rigid flat plate may be employed with simple modification of the optics and projection system. These and various other modifications which are intended to be encompassed herein may be included in the apparatus in accordance with the general scope of this invention.

As should be readily apparent, this invention provides for rapid access to copy being produced as well as flexibility as to using highly specular reflective materials in a specular projection system. Thus, there is now provided means for viewing brilliant displays in well lighted areas which may also be enlarged many times from the original. In addition, one can project either or both the photographically positive or the photographically negative image of original copy, and if desired, one can produce a permanent record, either or both photographically positive or photographically negative produced from original copy, of substantially any sort.

These and other advantages which should be apparent to those skilled in the art are embodied in this invention, and since various modifications are possible, it is the intention to cover broadly all such modifications and variations which will readily occur to one skilled in the art, within the scope of the appended claims.

What is claimed is:

1. A method of projecting and recording an image which comprises:
   (A) providing a developer dispensing member having a conductive and specularly reflecting surface;
   (B) coating said member with a thin layer of a conductive developing powder at least just sufficiently to substantially mask the specularly reflecting properties of said surface;
   (C) contacting said coated surface with the surface of a sensitized electrophotographic plate having a substantially uniform electrostatic charge thereon, said plate comprising a transparent supporting substrate having thereon a photoconductive layer;
   (D) exposing said plate through said transparent supporting substrate to an image pattern, thereby causing selective discharge of the sensitive surface and selective adherence of said developer particles to said plate in accordance with said image pattern, forming thereby on said plate a positive developed image and forming a negative of said image on said specular reflecting dispensing member by the absence of developer thereon;
   (E) separating said dispensing member from said plate and specularly projecting the image formed on said dispensing member to an image receiving means, while substantially simultaneously recording the positive image formed on said plate by transferring the developed image on said plate to a transfer medium.

2. The method of claim 1 wherein said substantially uniform layer of conductive developing particles is coated to create a sufficiently dense layer to substantially mask the specularly reflecting surface and a sufficiently thin layer to transfer substantially all of the developing powder from the reflecting surface to the plate in areas corresponding to areas of the plate activated by said image pattern, and thereby producing an image on said specularly reflecting surface which is photographically reverse of the image developed on said plate.

3. The method of claim 2 wherein said conductive specularly reflecting surface is coated with a uniform layer of conductive developing particles so as to effectuate a specular reflectivity density of between about 1 and 3.

4. The method of claim 3 wherein said specularly reflecting surface is a substantially smooth surface adapted to specularly reflect a substantial fraction of indirect light with a minimum of diffuse reflection.

References Cited in the file of this patent

UNITED STATES PATENTS

| 1,902,907 | Semenitz | Mar. 28, 1933 |
| 2,543,051 | Oughton et al. | Feb. 27, 1951 |
| 2,758,525 | Moncrieff-Yeates | Aug. 14, 1956 |
| 2,771,002 | Mayo et al. | Nov. 20, 1956 |
| 2,808,328 | Jacob | Oct. 1, 1957 |
| 2,817,598 | Hayford | Dec. 24, 1957 |
| 2,839,400 | Moncrieff-Yeates | June 17, 1958 |
| 2,895,847 | Mayo | July 21, 1959 |
| 2,901,374 | Gundlach | Aug. 25, 1959 |
| 2,940,847 | Kaprelian | June 14, 1960 |
| 2,968,552 | Gundlach | Jan. 17, 1961 |
| 2,968,553 | Gundlach | Jan. 17, 1961 |
| 2,996,400 | Rudd et al. | Aug. 15, 1961 |
| 3,083,623 | Mott | Apr. 2, 1963 |

FOREIGN PATENTS

| 723,534 | Great Britain | Feb. 9, 1955 |

OTHER REFERENCES

Photography (I), January 1958, vol. 13, No. 1, page 57 (London).

Photography (II), January 1958, vol. 13, No. 1, pages 44–47 (London).

Purves: "The Focal Encyclopedia of Photography," Focal Press, London, 1957 (1st edition), page 926 relied on.